United States Patent
Mueller et al.

(10) Patent No.: US 6,563,622 B2
(45) Date of Patent: May 13, 2003

(54) HIGH-SPEED COMMUNICATIONS SYSTEM

(75) Inventors: Eric R. Mueller, West Suffield, CT (US); Anthony J. DeMaria, West Hartford, CT (US)

(73) Assignee: TeraBit Communications, L.L.C., Bloomfield, CT (US)

( * ) Notice: Subject to any disclaimer, the term of this patent is extended or adjusted under 35 U.S.C. 154(b) by 0 days.

(21) Appl. No.: 09/929,656

(22) Filed: Aug. 14, 2001

(65) Prior Publication Data

US 2002/0036814 A1 Mar. 28, 2002

Related U.S. Application Data

(60) Provisional application No. 60/225,882, filed on Aug. 17, 2000.

(51) Int. Cl.[7] .............................. H04B 10/04
(52) U.S. Cl. ....................... 359/180; 359/181; 359/182; 359/188; 359/189; 359/128; 359/145
(58) Field of Search ................. 359/180, 181, 359/182, 188, 154, 189, 191, 193, 195, 128, 125, 137, 161, 173, 133, 117, 145

(56) References Cited

U.S. PATENT DOCUMENTS

| | | | | |
|---|---|---|---|---|
| 4,553,265 A | * | 11/1985 | Clifton et al. ............... | 455/325 |
| 5,379,309 A | * | 1/1995 | Logan, Jr. ..................... | 372/18 |
| 5,710,651 A | * | 1/1998 | Logan, Jr. .................... | 359/145 |
| 5,768,002 A | | 6/1998 | Puzey | |
| 5,796,506 A | * | 8/1998 | Tsai ........................... | 359/191 |
| 5,822,103 A | | 10/1998 | Boroson ..................... | 359/184 |
| 5,886,809 A | | 3/1999 | Puzey | |
| 5,896,211 A | | 4/1999 | Watanabe .................... | 359/124 |
| 6,031,644 A | | 2/2000 | Utsumi ........................ | 359/110 |
| 6,043,920 A | | 3/2000 | Leopold et al. ............. | 359/184 |
| 6,046,486 A | * | 4/2000 | McNamara et al. ......... | 257/477 |
| 6,115,162 A | * | 9/2000 | Graves et al. ............... | 359/173 |
| 6,118,566 A | * | 9/2000 | Price .......................... | 359/181 |
| 6,172,782 B1 | * | 1/2001 | Kobayashi ................... | 359/128 |
| 6,172,790 B1 | * | 1/2001 | Tiemann et al. ............. | 359/245 |
| 6,359,716 B1 | * | 3/2002 | Taylor ......................... | 359/189 |
| 6,366,377 B1 | * | 4/2002 | Tajima ........................ | 359/128 |

OTHER PUBLICATIONS

Dissertation by David Stephen Kurtz, "*Sideband Generation For Submillimeter Wave Applications*", May, 2000 Article published in The Wall Street Journal, Jun. 25, 2001 entitled "*World's Fastest Silicon Transistor*".
Article published in Applied Phys Lett. vol. 21, No. 11, Dec. 1, 1972 entitled "*Phase matched sumillimeter wave generation by difference–frequency mixing in ZnGeP2*".
PCT Written Opinion Under Rule 66 for International application No. PCT/US01/25358, International filing date Aug. 13, 2001.
Tetsuo Taniuchi, Jun–ichi Shikata & Hiromasa Ito "*Continuously tunable THz–wave generation from GaP crystal by difference frequency mixing with dual–wavelength KTP–OPO*", Darmstadt University GMM of Technology ITG p. 1 & 2.

(List continued on next page.)

*Primary Examiner*—Leslie Pascal
*Assistant Examiner*—Hanh Phan
(74) *Attorney, Agent, or Firm*—Cantor Colburn LLP

(57) ABSTRACT

A communications transmission system and method modulates a radiation source at higher rates for either fiber optic telecommunication systems or for digital electrical or optical switches associated with computer routers or servers. A first source provides a carrier signal; a modulator receives the carrier signal and an information signal to generate a modulated carrier signal. A second source provides a transmission signal; and a signal mixer receives the modulated carrier signal and the transmission signal to generate a frequency shifted transmission signal. The transmission system increases the amount of analog or digital information that can be transmitted over a communications network. The modulated carrier signal and the frequency shifted transmission signal may be filtered.

52 Claims, 6 Drawing Sheets

OTHER PUBLICATIONS

Eric R. Mueller, William E. Robotham, Jr., Richard P. Meisner, Richard A. Hart, John Kennedy and Leona A. Newman, "*2.5 THZ Laser Local Oscillator For The EOS Chem 1 Satellite*", Published in the Proceedings of the Ninth International Symposium on Space Terahertz Technology, p. 563 (1998) 12 pages.

Eric R. Mueller and Jerry Waldman, "*Power and Spatial Mode Measurements of Sideband Generated, Spatially Filtered Bubmillimeter Radiation*" IEEE Tranactions On Microwave Theory and Techniques, vol. 42, No. 10, Oct., 1994 1 page.

David S. Kurtz, Jeffrey L. Hesler et al, "*Millimeter–Wave Sideband Generation Using Varactor Phase Modulators*" IEEE Microwave and Guided Wave Letters, vol. 10, No. 6, Jun. 2000, pp. 245–247.

O. Tudisco "*Broad Band Far Infrared Fabry–Perot With Variable Finesse*", International Journal of Infrared and Millimeter Waves, vol. 9, No. 11, 1988, pp. 41–53.

Q. Chen and Zhiping Jiang, "*Near–field terahertz imaging with a dynamic aperture*" Optics Letters, vol. 25, No. 15, Aug. 1, 2000, pp. 1122–1124.

P.Y. Han and M. Tani "*Use of the organic crystal DAST for terahertz beam applictions*" Optics Letters, vol. 25, No. 9, May 1, 2000, pp. 675–677.

\* cited by examiner

Information Band;
- up to the highest information frequency component + $\nu_0$
- down to the lowest information frequency component + $\nu_0$ Information Band;
- up to the sideband frequency, $\Delta f$, + $\nu_0$
- down to the sideband frequency + $\nu_0$ minus the total information bandwidth ($f_{lbw}$)

HIGH-SPEED COMMUNICATIONS SYSTEM

REFERENCE TO RELATED APPLICATIONS

This application claims the benefit of U.S. Provisional Patent Application No. 60/225,882, filed on Aug. 17, 2000 which is incorporated herein by reference.

TECHNICAL FIELD

The present invention relates to fiber-optic transmission and to computer routers and servers, and, more particularly to a method and apparatus for a very high bandwidth analog or digital communications band source for use in fiber-optic data transmission applications or as very high bandwidth modulators for computer routers and servers.

BACKGROUND OF THE INVENTION

At present, one of the important communications bands for optical fiber is at a wavelength of about 1.5 μm. To get the most effective use of the bandwidth available in this band, a combination of direct modulation of 1.5 μm sources and wavelength division multiplexing (WDM) are typically employed. The maximum modulation rate for standard products are about 10 Gb/s and there are now some special modulators available at about 40 Gb/s. It appears that the approaches used to get to 40 Gb/s will not be scalable to much higher frequencies for a number of reasons. So by using different optical wavelengths (i.e., WDM technology) together with high modulation rates (e.g., 10 Gb/s to 40 Gb/s as available today), a fair degree of the available fiber bandwidth can be used. However this approach has a number of drawbacks including: the requirement for multiplexing in a format which does not lend itself to packet switching (as is typical on the internet), multiplexing in a format which presents significant challenges for repeaters (as are required for long haul transmission), the cost of WDM systems tends to scale with the required throughput (this is contrary to the economic need for the cost to decrease as the usage increases), and there is a desire to use even more of the available bandwidth. Consequently it is desirable to be able to operate at still higher modulation rates.

Many of these issues also exist for data communications associated with future computer systems that will require greater than 40 GHz modulators, which is the upper range of today's optical modulator technologies (e.g., integrated optics and electro-absorptive modulators).

SUMMARY OF THE INVENTION

These and other drawbacks and deficiencies of the prior art are overcome or alleviated by the present invention. A need exists to increase the amount of analog or digital information that can be transmitted over a communications channel such as a given optical fiber in fiber-optic communication applications or in future computer systems that will need to feed high data rate switches. Therefore, it would be desirable to have a method to directly modulate a 1.5 μm wavelength source at higher rates. In the interest of clarity, the present invention is described with respect to the 1.5 μm wavelength band, however the techniques described herein could also be employed at other fiber bands. WDM, or Dense Wavelength Division Multiplexing (DWDM), could then be applied to the result, with certain overlap restrictions.

A communications transmission system or light modulating system comprises a first source for providing terahertz (THz) radiation, a very large bandwidth modulator that imposes very large bandwidth information on the THz radiation, a second shorter wavelength source having an output wavelength suitable for transmission over fiber optic transmission systems, and a nonlinear optical conversion subsystem which imposes the THz modulated radiation onto the shorter wavelength transmission radiation to generate radiation suitable for transmission over a fiber optic communication system having the very large bandwidth information imposed on the resulting radiation to be transmitted through the optical fiber communication system or to ultra-fast switches used in ultra-fast computer servers and/or routers.

A method of increasing the amount of information transmitted over a communications channel and increasing the extinction ratio of a data transmission system comprises modulating a carrier signal having a first prescribed frequency with an information signal having a prescribed first bandwidth, generating thereby a modulated carrier signal having a second prescribed bandwidth; and mixing a transmission signal having a second prescribed frequency with the modulated carrier signal, generating thereby a converted transmission signal having a third prescribed bandwidth.

The above-discussed and other features and advantages of the present invention will be appreciated and understood by those skilled in the art from the following detailed description and drawings.

BRIEF DESCRIPTION OF THE DRAWING

Referring now to the drawings wherein like elements are numbered alike in the several figures:

FIG. 2A shows operating-mode frequency content for Mode 1 and FIG. 2B shows operating-mode frequency content for Mode 2 (the "Modes" will be described later in the text);

DESCRIPTION OF THE INVENTION

Figure 1A:
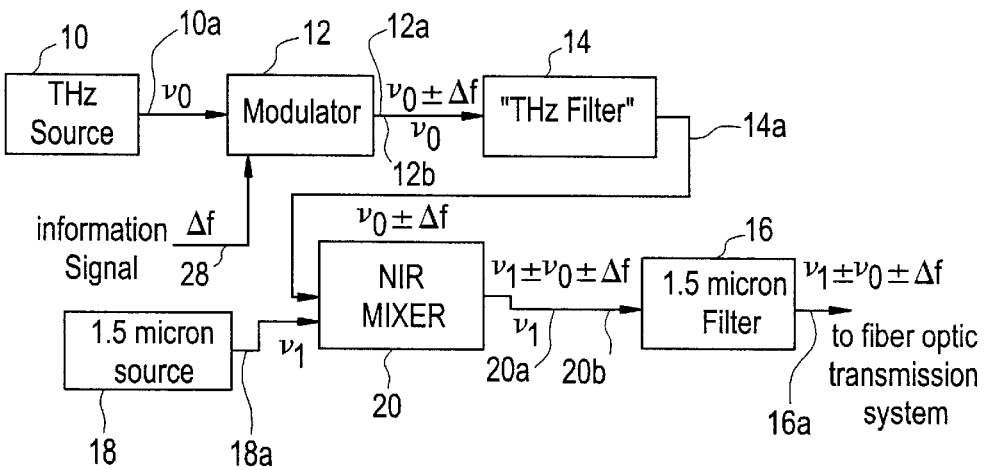
FIG. 1A is a schematic block diagram of a high-bandwidth modulator comprising a transmitter system suitable for very large bandwidth optical communication systems or for supplying very high data rates to ultra-fast computers, servers and routers.
Figure 1B:
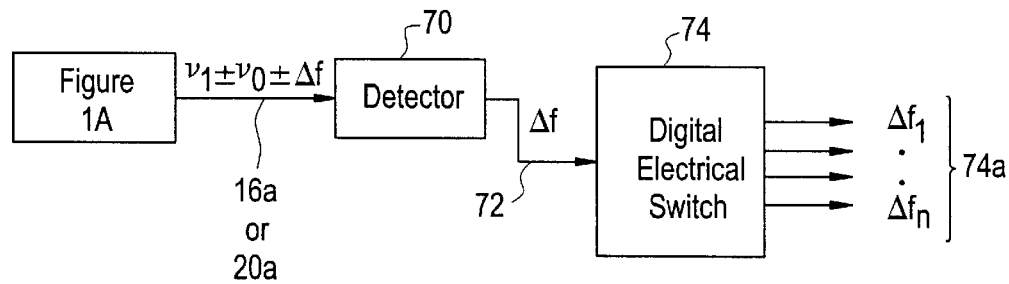
FIG. 1B is a schematic block diagram of an application of the system of FIG. 1A providing a signal to an optical detector providing thereby an input signal to a computer electrical switch.
Figure 1C:
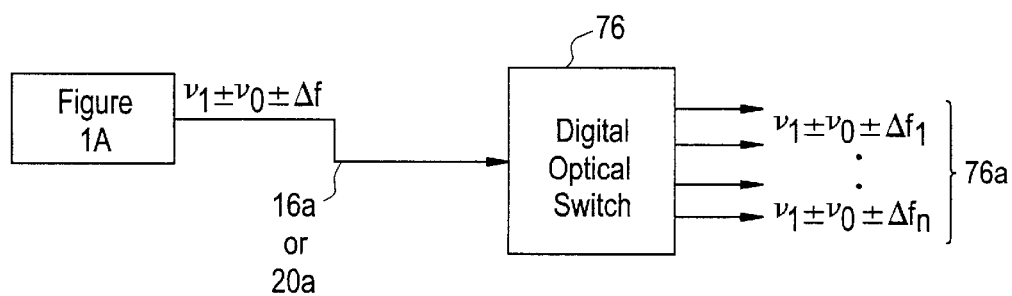
FIG. 1C is a schematic block diagram of an application of the system of FIG. 1A providing a signal to a computer optical switch.

Referring to FIG. 1A, a first source 10 provides THz radiation 10a as a carrier signal, which is modulated by modulator 12 with an information signal 28 having a very large bandwidth, Δf. The resultant modulated THz radiation 12a is then filtered by a THz filter 14 to remove un-modulated radiation, at a frequency of $v_o$ 12b. Such filtering may alternatively be accomplished with a 1.5 micron filter 16, described below. The filtered and modulated THz radiation 14a is then impressed upon, or mixed with, a transmission signal 18a such as 1.5 μm wavelength (about 200 terahertz) radiation 18a, originating from a second radiation source such as a 1.5 μm wavelength laser 18, by a non linear mixing process in a nonlinear optical subsystem 20 which shall be referred to here as a near infrared (NIR) mixer. Such a NIR mixer 20 may comprise a sum/difference crystal. The resultant frequency shifted radiation 20a is then filtered by the 1.5 micron (μm) filter 16 to remove un-modulated 1.5 μm radiation, at a frequency of $v_1$, 20b. Owing to the high bandwidth capability of the THz modulator 12, the present invention offers a dramatic increase in modulation rate available for the 1.5 μm source 18, and can be operated with all ambient-temperature components. The present invention does not require cryogenic cooling, does not require that the final extinction ratio for the system be achieved on the THz radiation signal 10a, and takes advantage of the inherent very large bandwidth available in THz devices such as Schottky diodes and ultra high frequency HEMT's, and transistors fabricated from SiGe material or other compound semiconductor materials (see "IBM Develops Fast Transistor Made of Silicon," on p. B7 of *The Wall Street Journal*, Monday, Jun. 25, 2001). Since cryogenic cooling is highly undesirable, the present invention is highly desirable for most commercial applications. It will be appreciated that the embodiment of FIG. 1 is merely an exemplary embodiment and alternatives will be apparent to one skilled in the art. For example, if the efficiency of the NIR mixer subsystem 20 were much greater at some wavelength other than 1.5 μm, or the strength or reliability of available sources were greater at some other wavelength, and this wavelength were not in a communications band, then the present invention could be carried out at that other wavelength and then that result could be shifted into the communications band in the same manner. In providing very broad band signals to switched computers, servers or routers, sources, other than traditional communications band sources, can also be utilized as the final wavelength in the system of FIGS. 1A, 1B and 1C.

As computers become faster, in order to satisfy the need for handling more information, very fast digital electrical switches and digital optical switches will be developed for computer routers and servers. Such switches will also be required to serve the expanding bandwidth needs of the Internet. The broad bandwidth modulator system of FIG. 1A can also be applied to fulfill the needs of these digital systems. FIG. 1B illustrates in schematic form how the output signal 16a or 20a of FIG. 1A is fed to a fast optical detector 70 capable of handling the Δf broad bandwidth signal 16a or 20a. The electrical output 72 of the detector 70 (i.e. the recovered information signal 28) is fed to a digital electrical switch 74 which provides as output one or more broad bandwidth signals 74a. The one or more broad bandwidth signals 74a are delivered to a corresponding channel in a fiber optic communications network or data system.

As the bandwidth increases beyond the ability of the digital electronic technology, the industry will probably transition to optical switching technologies. For this case the optical detector 70 is not required. The optical up-converted frequency, $v_1$, of FIG. 1A is selected to be compatible with the optical frequency required by a digital optical switch 74 of FIG. 1C. The digital optical switch 74 provides as output one or more broad bandwidth signals 76a. The one or more broad bandwidth signals 76a are delivered to a corresponding channel in a fiber optic communications network or data system.

Figure 2A:
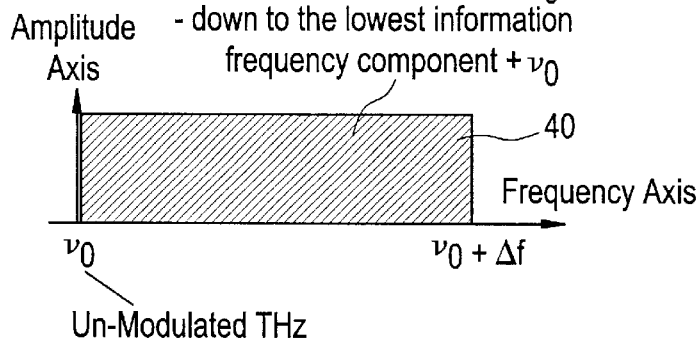
FIGS. 2A and 2B are diagrams of operating-mode frequency content, with only the upper THz sideband shown in the interest of clarity (in general the two THz sideband efficiencies will not be equal), where
Figure 2B:
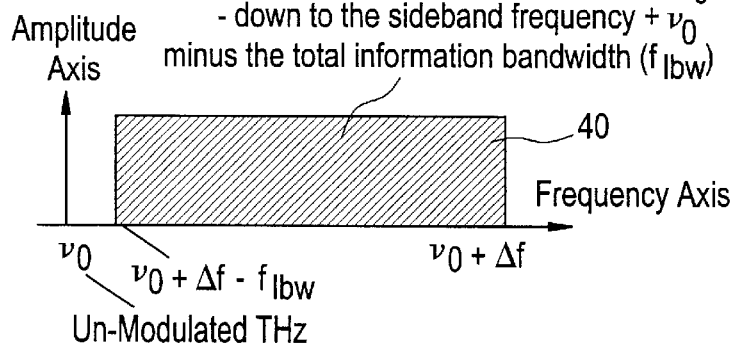

The present invention can be operated in Mode 1, as seen in FIG. 2A, wherein the sideband modulation is the information (e.g., the THz signal 10a is a carrier onto which the information is impressed and this information is the sideband signal), and in Mode 2, as seen in FIG. 2B, wherein a "primary sideband", $v_p$, is impressed upon the THz signal 10a and this primary sideband is (i) set to a frequency above the highest information modulation rate and (ii) amplitude modulated with the information modulation before being used to modulate the THz signal (e.g., the THz signal 10a is again a carrier and the primary sideband is a subcarrier which contains the information which was impressed upon it before it is used to modulate the THz signal 10a). Mode 1 is more demanding because the lowest information frequency component is at or near the unmodulated frequency $v_o$. Thus, this description will concentrate on explaining the system operation in this mode with the belief that if the system can operate in Mode 1, it will most certainly operate in Mode 2. The following calculations will also be applicable to operation in other modes and in fact the system operation will be expected to improve in many respects in other modes.

The THz source 10 could be any source of coherent THz radiation. Examples include: optically-pumped FIR (far infrared) lasers, directly multiplied sources, photo-mixers, or quantum cascade lasers. Since optically-pumped FIR lasers are relatively mature and provide the highest output power in a convenient package, such is used herein as an exemplary source. Optically-pumped FIR lasers have over three thousand cataloged discrete lines throughout the THz region, so operation virtually anywhere in THz spectrum is possible with an optically-pumped FIR laser source. While in the distant past optically-pumped FIR lasers have not been engineered for compactness or reliability, DeMaria ElectroOptics Systems, Inc. has developed compact, high-reliability, optically-pumped FIR lasers, one of which is being used on a long-duration space mission on NASA's Chem 1 satellite, as described in E. R. Mueller, W. E. Robotham, Jr., R. P. Meisner, R. A. Hart, J. Kennedy, and L. A. Newman, "2.5 THz Laser Local Oscillator for the EOS Chem 1 Satellite," Proc. $9^{th}$ Int. Symp. Space Terahertz Technol., p. 563 (1998), which is incorporated herein by reference. A feature of the present invention is that the optically-pumped FIR laser is an ambient temperature, reliable, source, which works well in the present invention. At present, extensive research and development is being performed to realize semiconductor cascade lasers that operate in the THz region. Once these sources are available, they can replace the optically pumped FIR gas laser discussed in this discloure.

Figure 3:
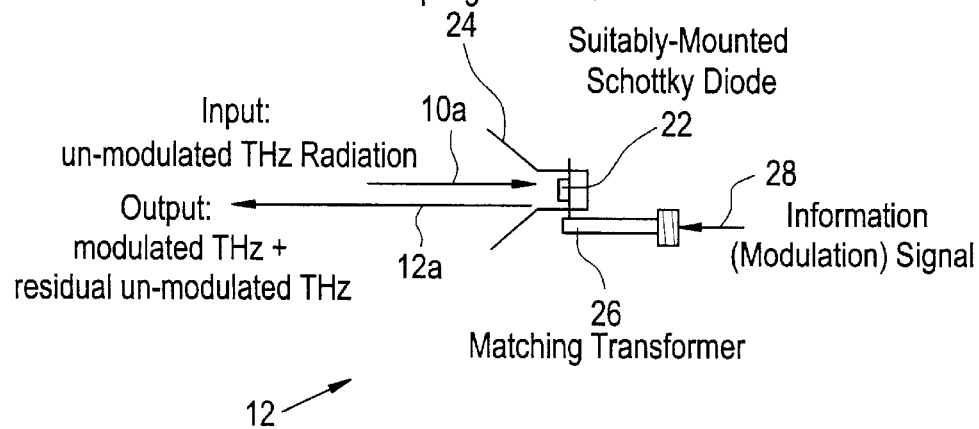
FIG. 3 is a representative diagram of a THz sideband generator (SBG) modulator.

Referring to FIG. 3, the modulator 12 is an exemplary THz modulator 12, such as a sideband-generator (SBG). By way of example, the SBG may be an ultra-high-frequency Schottky diode 22 or an ultra high frequency high electron mobility transistor (HEMT) (these devices can be operated as: conventional frequency modulators, or reflective phase modulators, or in some cases amplitude modulators), mounted in a suitable coupling structure 24, which provides for both coupling of the THz radiation 10a to the Schottky diode 22, and coupling of the information signal 28 to the Scottky diode 22. FIG. 3 is representative of a waveguide-mounted Schottky diode but quasi-optical coupling structures such as feedhorns, lenses or waveguides also work well in this function. The THz radiation 10a from the THz source 10 is coupled to the diode 22 along with the information signal 28, which is to modulate the THz source radiation 10a. If the information signal 28 is electrical in nature, then, an impedance matching device such as an impedance matching transformer 26 is used to improve the wideband match of the diode impedance to the impedance of the source of the information signal 28. The coupling structure 24 also serves to efficiently couple the modulated THz radiation 12a out of the SBG 12. Similar techniques have been used for spectroscopy and radar applications, see E. R. Mueller, and J. Waldman, "Power and Spatial Mode Measurements of Sideband Generated, Spatially Filtered, Submillimeter Radiation," IEEE MTT, 42(10), 1891 (1994), which is incorporated herein by reference. The SBG element used in such applications operated as a frequency modulator where the THz energy was coupled into the diode along with the sideband energy. The resulting two currents were mixed via the non-linear behavior of the diode, to produce sum and difference frequency components. The conversion loss, CL (seen in Eq. 1, is defined as the ratio of the modulated output power in a single sideband divided by the incident unmodulated input power) of this SBG was 31 dB at 1.6 THz. Thus, $$CL = \frac{P(v_o \pm \Delta f)|_{at12a}}{P(v_o)|_{at10a}} \qquad (1)$$

where for example $P(v_o+\Delta f)|_{at12a}$ is the power at frequency $v_o+\Delta f$ at the output of the modulator 12a, and $P(v_o)|_{at10a}$ is the power at frequency $v_o$ at the input to the modulator 10a. This, combined with the terahertz filtering for such applications resulted, in 1.6 THz radiation modulated with an extinction ratio, ER (seen in Eq. 2, is defined as the ratio of modulated output power in a single sideband divided by the unmodulated power present in the output beam) of 20 dB. Thus, $$ER = \frac{P(v_o \pm \Delta f)|_{at12a}}{P(v_o)|_{at12b}} \qquad (2)$$

where for example $P(v_o+\Delta f)|_{at12a}$ is the power at frequency $v_o+\Delta f$ at the output of the modulator 12a, and $P(v_o)|_{at12b}$ is the power at frequency $v_o$ at the input to the modulator 12b. The present invention utilizes, in this exemplary embodiment, a modified version of these Schottky diode sideband generators (e.g. reflective phase modulators) as the high frequency (bits/s) modulator.

The Schottky diode sideband generators considered here have bandwidths on the order of 10 THz. The performance of a given model of Schottky diode SBG will fall with frequency roughly as frequency squared, once above the rolloff point (typically on the order of 0.8 to 3 THz, depending on the diode design). These are motivations for utilizing THz radiation 10a for the initial information carrier in the high-bandwidth communication system 100 of the present invention. In fact when operated as a detector, the Schottky diode can only respond to radiation, which it can follow on a cycle-per-cycle basis. Accordingly, if the Schottky SBG responds at a given "carrier" frequency (e.g., 3 THz) then the Schottky diode can carry modulation information to any frequency up to that "carrier" frequency. The challenge is to efficiently couple energy simultaneously at the terahertz drive, or carrier frequency ($v_o$), modulation, information frequency ($\Delta f$) and the resulting sideband frequency ($v_o \pm \Delta f$).

Recently improvements to the E. R. Mueller, and J. Waldman, "Power and Spatial Mode Measurements of Sideband Generated, Spatially Filtered, Submillimeter Radiation" device resulted in improved conversion loss by building a special Schottky diode, which was operated in varactor mode to create a reflective phase modulator. In this operating mode the THz radiation does not have to propagate as a current inside the diode for the SBG to work. This avoids many parasitic loss issues. Instead, the impedance that the diode presents to the THz radiation is modulated at the sideband frequency, thus modulating the complex reflection coefficient of the SBG at the sideband frequency. This reflective phase modulator SBG device produced a conversion loss of 14 dB at 1.6 THz, (D. S. Kurtz, "Sideband Generation For Submillimeter Wave Applications," PhD dissertation, University of Virginia, May 2000, which is incorporated herein by reference) and even better performance in a W-band demonstration modulator (D. S. Kurtz, J. L. Hesler, T. W. Crowe, and R. M. Weikle, II, "Millimeter-Wave Sideband Generation Using Varactor Phase Modulators," IEEE Microwave & Guided Wave Lett., 10(6), 245 (2000)), which is incorporated herein by reference. These SBG results are a 17 dB improvement over the previous E. R. Mueller, and J. Waldman, "Power and Spatial Mode Measurements of Sideband Generated, Spatially Filtered, Submillimeter Radiation" device. With these already demonstrated results the expected SBG output powers can be calculated: based on power handling constraint estimates, this reflective phase modulator SBG should be able to operate without damage with input powers up to roughly 50 to 100 mW, so, with a 14 dB conversion loss, the modulated output would be roughly 2 to 4 mW. Alternatively if the frequency modulator version were used: the power handling is roughly 20 to 50 mW, so with a 31 dB conversion loss the modulated output would be about 15 to 40 $\mu$W.

The THz filter 14 is used to remove un-modulated THz radiation 12b, at a frequency of $v_o$, prior to mixing this radiation with the 1.5 $\mu$m radiation 18a, at a frequency of $v_l$, thus improving the extinction ratio prior to the "up-conversion" to 1.5 $\mu$m. Alternatively, filtering of the un-modulated THz radiation 12b may be performed after the up-conversion to 1.5 $\mu$m using the 1.5 $\mu$m filter 16.

The approach taken here to achieve the desired extinction ratio may have uses on its own for systems other than the example given herein. Namely, instead of requiring that the modulator for a given system operate with the eventually-desired extinction ratio, the present invention takes advantage of the frequency offsets offered by a multi-step frequency conversion process to enable filtering to be employed to improve extinction ratio. Thus, this method allows modulator technologies, which were previously considered unacceptable due to "poor" extinction ratios, to now potentially be viable again since the eventual extinction ratio can now be achieved by selective filtering as disclosed herein.

In the present exemplary systems, the extinction ratio of the THz modulators is not sufficient to meet the system performance requirements (in fact is negative), but with the judicious application of filtering, the resulting filtered extinction ratio becomes usable.

The information signal creates another frequency component (or band of frequency components as seen at 40 in FIGS. 2A and 2B) impressed on the THz radiation 10a, which affects the optimal selection of the THz filter 14. In Mode 1 (described hereinafter) the transmitter 100 is restricted in the information format that it can transmit in that it will not work at DC (save, the trivial case of always off). Thus, there will be a lower limit on the bit rate that the system can transmit and a corresponding minimum distortion in a given pulse temporal profile. In Mode 2 this restriction is lifted so that the any bit rate up to some maximum can be transmitted. In the following description an example is given of a maximum bit rate of 160 Gb/s, but this technique is not limited to 160 Gb/s operation.

It will be appreciated that the required performance of the terahertz filter 14 will depend primarily upon three quantities: (1) the desired final extinction ratio, (2) the output power of the modulator 12 at a frequency of $v_o + \Delta f$, and (3) the reflected un-modulated output power off the modulator (the modulator does not, in general, reflect all of the un-modulated radiation). For purposes of the present example, an extinction ratio (as defined earlier, but for purposes of illustration regarding communications it will be equally valid to define extinction ratio as the power at the logic high condition divided by the power at the logic low condition) requirement of 18 dB is considered here, based upon the desire for simple direct detection of the eventually modulated 1.5 µm radiation and requirements for low-loss soliton propagation in long-run fibers, but lower extinction ratios may be acceptable and these lower ratios will only be easier to obtain.

The extinction ratio can be: established in the THz signal before being impressed onto the 1.5 µm radiation, improved by filtering of the 1.5 µm radiation 18a, or a combination of these two. For purposes of illustration the first of these options will be considered here. Accordingly, the extinction ratio can be given at 14a of FIG. 1 as the ratio of the modulated THz signal 12a divided by the unmodulated THz signal 12b.

The frequency modulation SBG described in the E. R. Mueller, and J. Waldman, "Power and Spatial Mode Measurements of Sideband Generated, Spatially Filtered, Submillimeter Radiation" reference had a un-modulated reflection coefficient for the drive radiation ($v_o$) of −10 dB (this result was obtained by tilting the lower face of the corner-cube mount by 19 degrees). Thus, the extinction ratio directly out of this modulator was −21 dB (−31 dB sideband power referred to the incident drive power (conversion loss) minus −10 dB unmodulated drive power reflected out of the modulator again referred to the incident drive power=−21 dB), whereby the THz filter must improve this by 39 dB to obtain the desired 18 dB extinction ratio. The reflective phase modulator SBG could potentially be fabricated to have a similar un-modulated reflection coefficient. Using conservative estimates, namely assuming that it would be 5 dB worse than the E. R. Mueller, and J. Waldman, "Power and Spatial Mode Measurements of Sideband Generated, Spatially Filtered, Submillimeter Radiation" results, e.g., −5 dB, then the extinction ratio directly out of this modulator would be −9 dB (−14 dB sideband power referred to the incident drive power (conversion loss) minus −5 dB unmodulated drive power reflected out of the modulator again referred to the indicent drive power=−9 dB), whereby the THz filter 14 must improve this by 27 dB to obtain the desired 18 dB extinction ratio.

Two alternatives are considered herein for the THz filter 14: an etalon diplexer (see, E. R. Mueller, and J. Waldman, "Power and Spatial Mode Measurements of Sideband Generated, Spatially Filtered, Submillimeter Radiation") and an inverse Fabry-Perot etalon, (see, O. Tudisco, "Broad Band Far Infrared Fabry-Perot with Variable Finesse", Int. J. of Infrared & MMW 9, No. 1, 41 (1988), which is incorporated herein by reference), but there are other diplexing designs which will be readily apparent to one skilled in the art. Concentrating on the most restrictive case of operation (Mode 1), it is beneficial to provide expected performance calculations.

Figure 6:
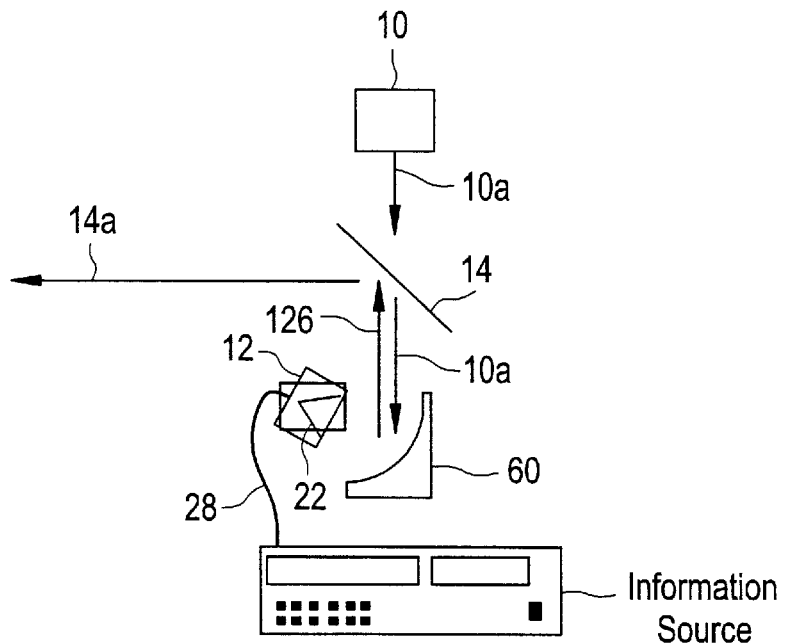
FIG. 6 is a schematic diagram of an etalon diplexer.

The etalon diplexer 30 of FIG. 6, described in the E. R. Mueller, and J. Waldman, "Power and Spatial Mode Measurements of Sideband Generated, Spatially Filtered, Submillimeter Radiation" reference is a device comprising of a low-loss etalon 32 tipped at an angle. Etalon diplexer 30 is, for example, a thinner version of the etalon diplexer in the E. R. Mueller, and J. Waldman, "Power and Spatial Mode Measurements of Sideband Generated, Spatially Filtered, Submillimeter Radiation" reference. The etalon 32, operated in S-polarization with a drive frequency of 2.52 THz (there happens to be a very strong FIR laser line at this frequency), with a high-purity Si etalon, 177.75 µm-thick, tipped at a 45 degree angle, results in a reflection vs. sideband frequency ($v_o \pm \Delta f$) calculated using the Fresnel equations for a multilayered system (E. R. Mueller, and J. Waldman, "Power and Spatial Mode Measurements of Sideband Generated, Spatially Filtered, Submillimeter Radiation"), which is presented at 42 in FIG. 4. The mid-band loss is 1 dB, and the calculated drive isolation is 45 dB (i.e., the reflection of the un-modulated drive radiation at a frequency of $v_o$). In the etalon diplexer the drive isolation is given by:

$$I_D = \frac{T_{vo}}{R_{vo}} \quad (3)$$

where $I_D$ is the drive isolation, $T_{vo}$ is the transmission of the etalon at frequency $v_o$, and $R_{vo}$ is the reflection of the etalon at frequency $v_o$. It is has been experimentally verified for etalons of this type that the 1 dB mid-band loss is correct, but the 45 dB isolation is optimistic.

Measuring one of these etalons, the drive isolation is found to be about 23 dB (this decrease in isolation is due to walk-off effects (E. R. Mueller, and J. Waldman, "Power and Spatial Mode Measurements of Sideband Generated, Spatially Filtered, Submillimeter Radiation")). Thus a single etalon of this type will improve the extinction ratio by 22 dB ($I_D$ minus the mid-band loss). This is not enough for either of the SBG modulators but two or more of these etalons 32 can be used in series (E. R. Mueller, and J. Waldman, "Power and Spatial Mode Measurements of Sideband Generated, Spatially Filtered, Submillimeter Radiation"). For two etalons 32 in series the improvement would be 44 dB which is sufficient for either of the SBG modulators and the expected mid-band extinction ratios would be: 23 dB for the E. R. Mueller, and J. Waldman, "Power and Spatial Mode Measurements of Sideband Generated, Spatially Filtered, Submillimeter Radiation" reference modulator, and 35 dB for the reflective phase modulator. These extinction ratios result from the improvements in extinction ratios generated by the THz filter 14 namely:

$$E_{R2} = E_{R1} + I_D - L \quad (4)$$

where $E_{R2}$ is the extinction ratio after the THz filter, $E_{R1}$ is the extinction ratio before the THz filter, $I_D$ is the drive isolation, and L is the loss of the THz filter (L was taken as the mid-band loss to produce the example values above).

Figure 4:
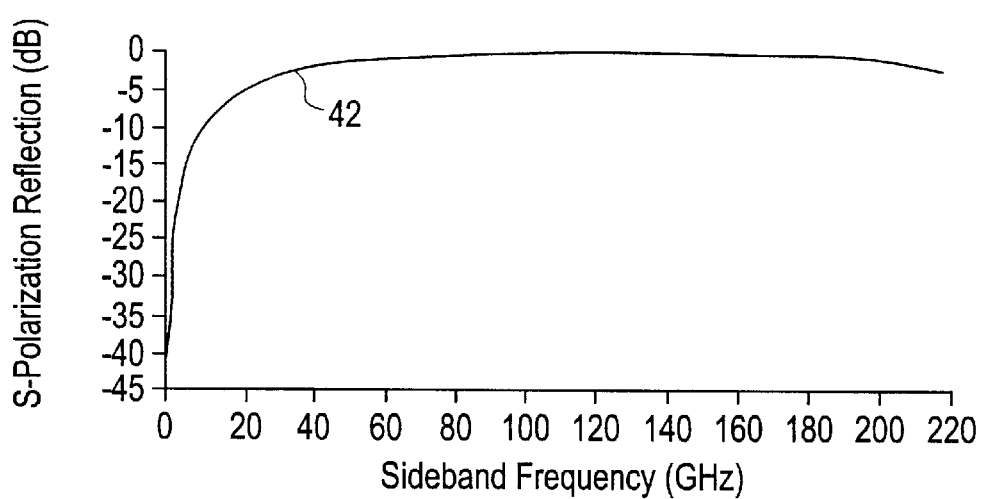
FIG. 4 is a plot of S-polarization reflectivity of a 177.75 μm-thick Si etalon vs. offset frequency, where the vertical axis is the reflection in dB, and the horizontal axis is the offset frequency in GHz.

Strictly speaking, L is a function of frequency. In fact the filter's frequency dependence is what is exploited here to obtain the "filtering" function, so the amount of desired, modulated, signal lost in the THz filter will be a function of offset frequency Δf. In FIGS. 4 and 5 the frequency (x-axis) is the offset, or sideband frequency, Δf, whose offset is in reference to the THz carrier frequency $v_o$. Since L is a function of Δf, the achieved extinction ratio will also be a function of Δf. Accordingly, the range of Δf over which the desired extinction ratio, 18 dB, can be achieved can be calculated from equation (1) above by explicitly expressing the frequency dependence of L.

Considering the lowest offset frequency point (e.g., the lowest sideband frequency at which one would wish to operate) at which the extinction ratio will drop to 18 dB, and including the bandwidth narrowing caused by using two etalons 32 in series, the lowest modulation rate will be limited to about 28 GHz for the E. R. Mueller, and J. Waldman, "Power and Spatial Mode Measurements of Sideband Generated, Spatially Filtered, Submillimeter Radiation" reference modulator, and about 8 GHz for the reflective phase modulator. These limits can be avoided by operating in Mode 2 where the entire information band can be pushed up in frequency.

It will be noted that if the etalon diplexer 30 is preferred as the THz filter 14, then the drive radiation at a frequency of $v_o$ will propagate directly through the first etalon 32 (which is oriented at an angle, typically 45 degrees) while the sideband at a frequency of $v_o \pm \Delta f$ will be reflected off of the etalon 32. Therefore, the co-linearity of the path of the drive radiation 10a and the path of the sideband radiation 12a in FIG. 3 will not produce an issue here.

Figure 7:
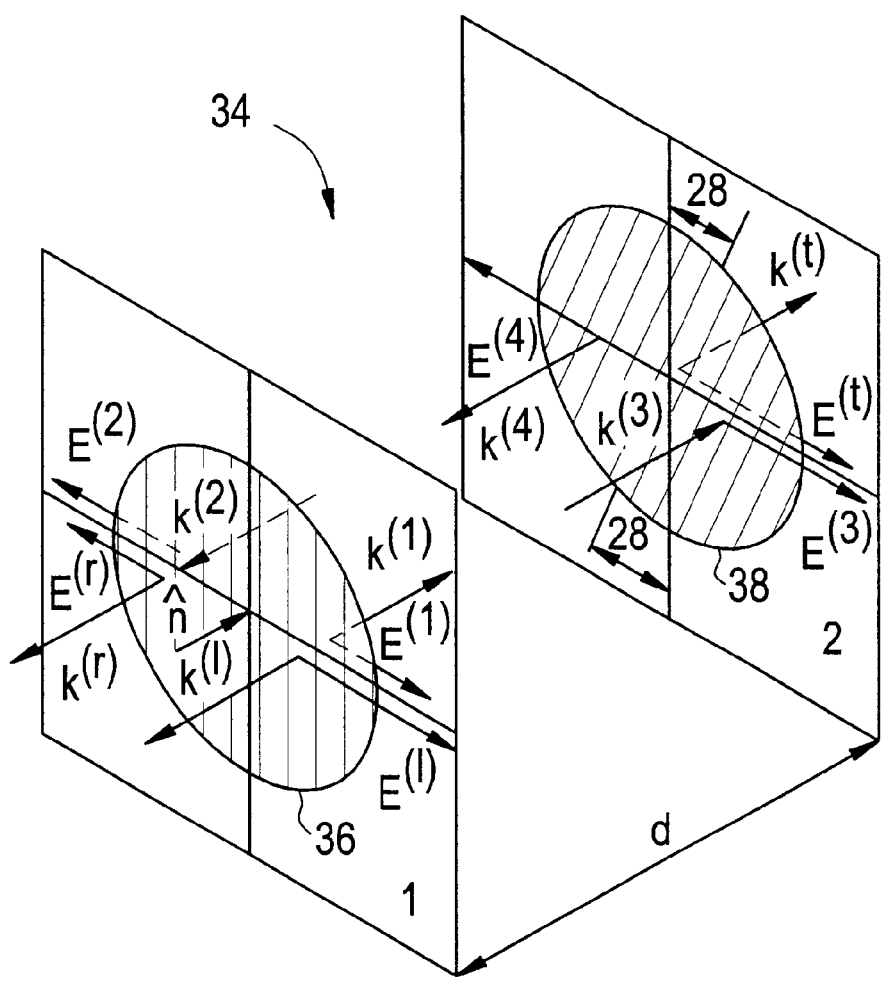
FIG. 7 is a schematic diagram of an inverse Fabry-Perot etalon.

An Inverse Fabry-Perot (IFP) etalon 34 (O. Tudisco, "Broad Band Far Infrared Fabry-Perot with Variable Finesse", Int. J. of Infrared & MMW 9, No. 1, 41 (1988)) of FIG. 7, comprises two reflective polarizers 36, 38 (typically wire grids in the THz region) which are aligned parallel to each other but their axial rotational orientations are offset by an angle Theta (θ). The k-arrows indicate the wavevectors of all waves involved in this apparatus. Immediately before the first polarizer 36, there are the incident electric field $E^{(i)}$ and the reflected one $E^{(r)}$. Between the two polarizers 36, 38 there are the electric fields $E^{(1)}$ and $E^{(3)}$ of the wave going forwards, and the fields $E^{(2)}$ and $E^{(4)}$ of the one coming back. After the second polarizer 38, there is the wave transmitted by the two polarizers 36, 38, whose electric field is $E^{(t)}$. The versor n̂ is the normal to both surfaces of the polarizers 36, 38. This device is called an Inverse Fabry-Perot etalon because it exhibits peaks in reflection instead of peaks in transmission. The spacing between these peaks is given by the free-spectral-range, $v_s = c/2d$, where c is the speed of light and d is the spacing between the polarizers 36, 38. Very wide transmission bandwidths are realizable with practical spacings. In a system employing an IFP etalon 34 the output from the SBG would be propagated directly through the IFP etalon 34. Thus the un-modulated drive radiation at a frequency of $v_o$ would be reflected back towards the SBG (a very slight tip could be employed to reduce undesired standing-wave effects) and the modulated signal at a frequency of $v_o \pm \Delta f$ would propagate through the IFP etalon 34.

Figure 5A:
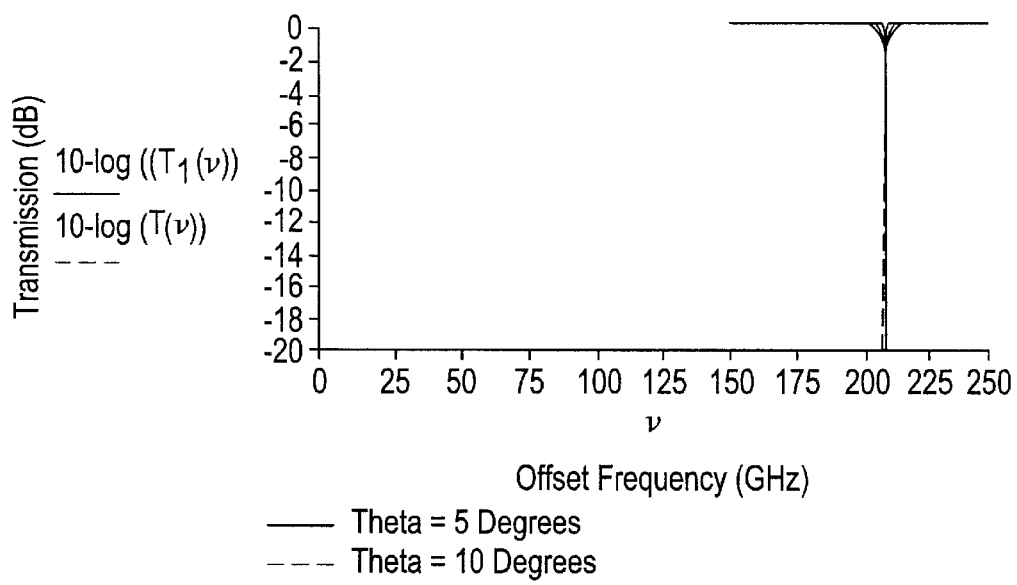
FIGS. 5A, 5B and 5C are plots of transmission (dB) vs. offset frequency (GHz) of an inverse Fabry-Perot (IFP) etalon operating with a spacing of 713.79 μm and a drive frequency of 2.52 THz, where FIG. 5B includes data of FIG. 5A, but is expanded about the region near zero offset to illustrate the performance effects, and where theta=10 degrees data are presented as the dashed curves, theta=5 degrees are presented as the solid curve (these are not distinguishable in FIG. 5A) and where FIG. 5C includes data of FIG. 5A but is expanded about the region near 210 GHz.
Figure 5B:
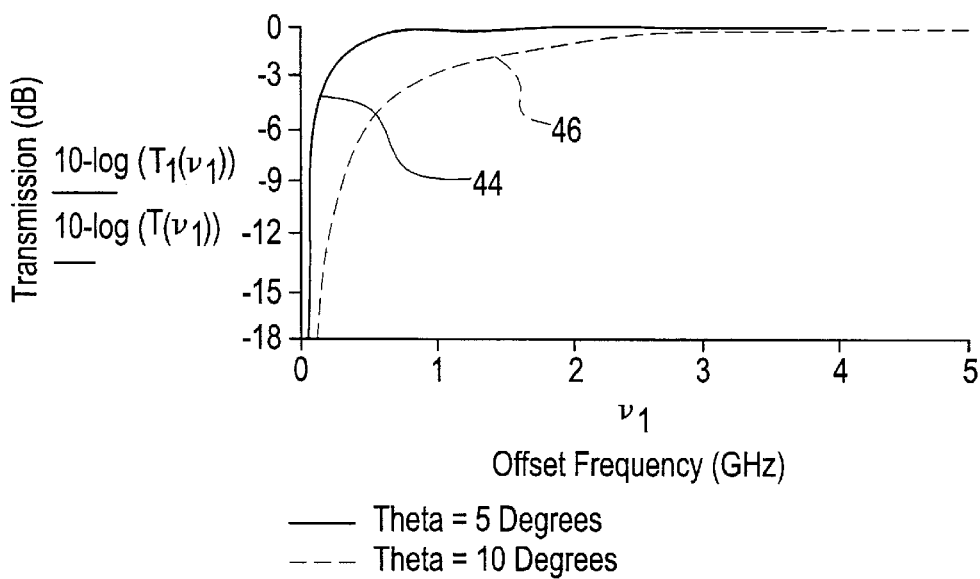
Figure 5C:
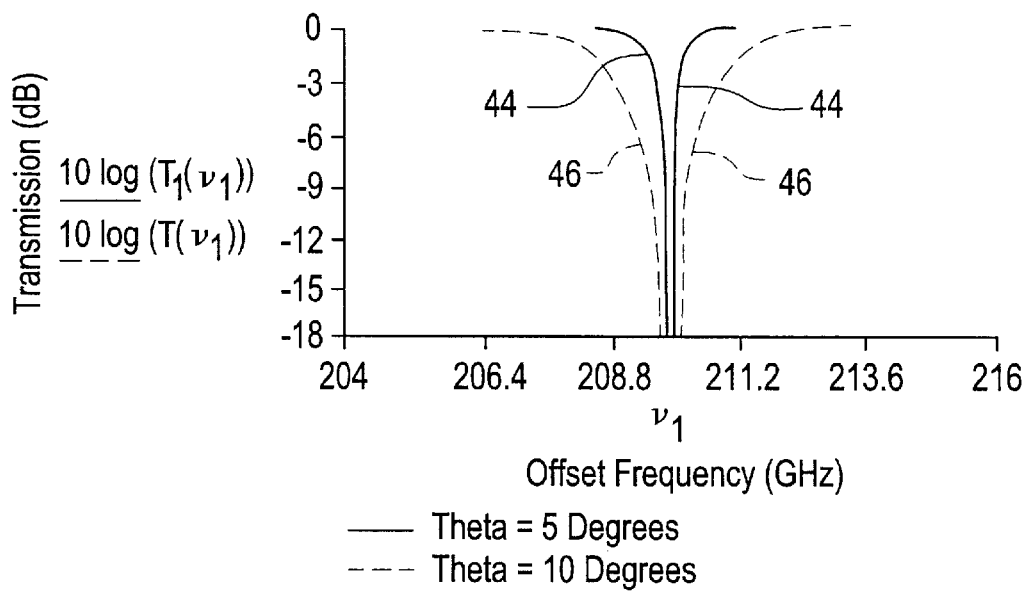

An additional feature of the IFP etalon 34 is that its finesse is adjustable by simply adjusting the axial rotational offset between the polarizers 36, 38. While the bandwidth and lowest modulation rate (in Mode 1) will improve with reduced angle, θ, the alignment requirements and sensitivity to imperfections in the polarizers 36, 38 will also increase with reduced angle, θ. To illustrate the axial angular tuning effects, the transmission results from the O. Tudisco, "Broad Band Far Infrared Fabry-Perot with Variable Finesse" reference are plotted with a nominal spacing of d=713.79 μm operated with a 2.52 THz drive signal 10a at 44 and 46 in FIGS. 5A, 5B and 5C. Referring to FIGS. 5A, 5B and 5C, the low sideband performance and mid-band loss can be quite good in an IFP etalon. But it must be remembered that the data in FIGS. 5A, 5B and 5C are calculated based upon a perfectly aligned IFP etalon using perfect polarizers, whereas the etalon information presented earlier is based upon previously experimentally-observed performance. However, accepting the Theta=10 degree calculated results, but adding a prudent degradation factor such that the drive isolation is 25 dB, and the mid-band loss is 0.5 dB, then the single IFP etalon improvement in extinction ratio would be 24.5 dB. Again, this is not sufficient for either SBG to provide the desired 18 dB extinction ratio so two or more IFP etalons 34 will be needed to be used in series thus yielding an extinction ratio improvement of 49 dB. In this configuration the expected mid-band extinction ratios would be: 28 dB for the E. R. Mueller, and J. Waldman, "Power and Spatial Mode Measurements of Sideband Generated, Spatially Filtered, Submillimeter Radiation" reference modulator and 40 dB for the reflective phase modulator. The lowest modulation rate in Mode 1 operation would be about 500 MHz for the reference E. R. Mueller, and J. Waldman, "Power and Spatial Mode Measurements of Sideband Generated, Spatially Filtered, Submillimeter Radiation" modulator and about 150 MHz for the reflective phase modulator.

It will be noted that the co-linearity of the drive 10a and sideband radiation 12a paths (FIG. 3) does present an issue for the application of the IFP etalon 34 here. To avoid or mitigate this, either a beamsplitter could be used between the SBG and the IFP etalon (with the commensurate loss in power) or slight off-axis coupling of the THz radiation 10a into the SBG 12 could be employed (in $1^{st}$ order this would only impact the SBG efficiency as the sideband radiation path will be dictated by the antenna pattern of the SBG coupling structure 24) with an optical layout which uses this to separate the drive radiation path 10a from the sideband (and un-shifted reflected drive radiation) path 12a. Thus, the resulting SBG output beam 12a could then be sent directly into the IFP etalon 34.

Since both of these alternative THz filters 14 are interference devices, the build-up time for the THz filter should also be considered as this may effect transient performance. The build-up time is the time required for light to make the required number of successive passes within the device to meet performance requirements, e.g., build-up sufficient cavity Q. Essentially obtaining the Q required to achieve a specific performance level in a given THz filter 14 will depend on the number of successive passes required to produce the interference effect with the required precision. If one is operating at 160 GHz then the distance light will travel in free space in 1 cycle is 1.9 mm, and in Si at 2.52 THz is 550 μm. The required number of passes in the particular THz filter to achieve the desired performance, needs to be calculated and the thickness (or spacing if discussing the IFP etalon) may need to be adjusted accordingly. For example, in the etalon diplexer and IFP etalon presented above, the number of passes during a 160 GHz transient may not provide the desired transient performance (the etalon diplexer would have 3 passes during the transient and the IFP etalon would have 2.7 passes). If that is the case, then the thickness (or spacing) could be reduced to improve the transient performance (e.g., the change in the shape of a pulse as the pulse passes through the etalon).

The 1.5 μm wavelength source 18 can be any coherent 1.5 μm source but distributed feedback (DFB) semi-conductor lasers may be preferred. As the output 16a of the system 100 may be expected to be propagated through an Erbium-Doped-Fiber-Amplifier (EDFA), which is also commonly used in communications systems, it is instructive to examine some of the typical operating parameters of EDFA'S. Representative performance numbers for an EDFA are: Gain=25 dB, Noise Figure=4.5 dB, both with about −30 to −10 dBm input.

The NIR mixer 20, which, as mentioned hereinbefore, can be any nonlinear optical subsystem which generates sum or difference frequency radiation between the 1.5 μm radiation 18a and the filtered 14a or unfiltered 12a THz radiation, is used to up-convert the modulated THz radiation at a frequency of $v_o \pm \Delta f$ to 1.5 μm for use in a fiber optic transmission system. Either sum or difference frequency generation or optical parametric oscillation could be used. NIR mixer 20 comprises, for example, ZnTe (see, Q. Chen, Zhiping Jiang, G. X. Xu, and X.-C. Zhang, "Near-field terahertz imaging with a dynamic aperture," Optics Lett., 25(15), 1122 (2000), which is incorporated herein by reference), DAST® (see, P. Y. Han, M. Tani, F. Pan, and X.-C. Zhang, "Use of the organic crystal DAST for terahertz beam applications," Optics Lett., 25(9), 675 (2000), which is incorporated herein by reference), GaP (see, T. Taniuchi, J.-I. Shikata, and H. Ito, "Continuously Tunable THz-Wave Generation from GaP Crystal by Difference Frequency Mixing with a Dual-Wavelength KTP-OPO", which is incorporated herein by reference) or ZnGeP$_2$ (see G. D. Boyd, T. J. Bridges, C. K. N. Patel and E. Buehler, "Phase-matched Submillimeter wave Generation by Difference-frequency Mixing in ZnGeP$_2$, which is incorporated herein by reference). The present invention is not limited to such materials, as other suitable crystals may also be employed, as will be readily apparent to one skilled in the art.

NIR conversion efficiency is defined here as the ratio of the power of the signal 14a entering the crystal 20 at a frequency of $v_o+\Delta f$ to the power of the signal 20a exiting the crystal 20 at a frequency of $v_1+v_o+\Delta f$. The desired conversion efficiency of the NIR mixer 20 is calculated as follows. If it is assumed that the output from the system 100 will be delivered to an EDFA, then, with noise considerations included, it is desirable to have about −10 dBm to deliver to the EDFA. Final signal-to-noise requirements combined with the achievable amplifier noise figures might permit the communications system 100 to work well with less than −10 dBm, but in the interest of clarity this will be used as a "going-in" requirement for the purposes of these calculations. For the purposes of the present description the conversion efficiency is a THz photon conversion efficiency so that the output power of the up converted 1.5 μm radiation 20a could be larger than the THz input power owing to the much higher energy per photon at 1.5 μm.

With the example of 2.52 THz drive signal 10a and a 1.5 μm nominal communications source 18, the energy per photon ratio is 79. The required photon conversion efficiency can be calculated with $$E_p = \frac{P_o}{R_{PE} \cdot P_{in}} \quad (5)$$

where $E_p$ is the photon conversion efficiency, $P_o$ is the desired output power, $R_{PE}$ is the photon energy ratio, and $P_{in}$ is the THz input power. So, with a desired output power of −10 dBm, the photon conversion efficiency for the E. R. Mueller, and J. Waldman, "Power and Spatial Mode Measurements of Sideband Generated, Spatially Filtered, Submillimeter Radiation" reference modulator, operating with an output of 40 μW, and assuming 2 dB of loss in the THz filter 14, would need to be at least 5%. With a desired output power of −10 dBm the photon conversion efficiency for the reflective phase modulator 12 operating with an output power of 4 mW, and assuming 2 dB of loss in the THz filter 14, would need to be at least 0.05%.

Many of the aforementioned references on up-conversion relate to pulsed performance, where the peak pump power can be fairly large. In the present invention the up-conversion is performed on a continuous-wave (CW) 1.5 μm source 18 so that the peak pump power is expected to be much smaller. Examining the expected dependencies of the unsaturated photon conversion efficiency:

$$E_p \alpha \frac{P_p^2 \cdot \chi_2^2}{\lambda_p^2} \quad (6)$$

where $P_p$ is the instantaneous power of the pump radiation, $\chi_2$ is the non-linear susceptibility, and $\lambda_p$ is the wavelength of the pump radiation. In an effort to provide an order-of-magnitude estimate of the expected efficiency, consider previous results for a CW non-linear process (CW frequency doubling a 9.3 μm laser, which can be looked at as sum frequency generation of the pump radiation) where with $\lambda_p=9.3$ μm, $P_p=30$ W, and $\chi_2=33$ (AgGaSe$_2$). Such data produced 100 mW frequency-doubled CW output with 30 W of CW input. This is a conversion efficiency of 0.33%. With the scaling given in equation (2) and using $\lambda_p=1.5$ μm, $P_p=1$ W, and $\chi_2=108$ (ZnTe), the predicted efficiency would be 0.15%. This result would be more than sufficient for a system employing the reflective phase modulator 12. The 1.5 μm filter 16 comprises a standard communications filter, such being well known. As the present standards for WDM are 400 GHz channel spacing (a new 100 GHz channel spacing standard is starting to be used), and the un-modulated 1.5 μm radiation, at a frequency of $v_1$ in this example, will be at least 2.52 THz from the up converted 1.5 μm radiation, a standard filter having stop band isolation great enough to preserve the extinction ratio is preferred. As mentioned earlier, depending upon performance and complexity trade-offs, it may be desirable to omit the THz filter 14 and perform the same filtering by filtering the up-converted signal 20a at a frequency of $v_1+v_o+\Delta f$ (plus various difference frequencies), containing both the modulated 12a and un-modulated 12b output of the THz modulator 12, at frequencies of $v_o \pm \Delta f$ and $v_o$ respectively, mixed with the 1.5 μm radiation 18a at a frequency of $v_1$. In that case, the spacing between the information band, at a frequency of $f_{ibw}$, and the closest non-information frequency $(v_1+v_o)$ would be dependent upon the operating mode (e.g., the lowest information frequency in Mode 1 $(v_1+v_o)$, and the "primary sideband" frequency $v_p$ minus the information bandwidth in Mode 2) and the 1.5 μm filter 16 having a steep enough frequency characteristic to discern the information-containing radiation at a frequency of $v_1 \pm v_o \pm \Delta f$ from the non-information-containing radiation at a frequency of $v_o+v_1$.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A light modulating system, comprising:
a signal transmitter including:
a first source of radiation for providing optical radiation as a carrier signal within the frequency range of approximately 300 gigahertz to 30 terahertz;
a modulator receptive to the optical radiation and an information signal to generate modulated optical radiation;
a second source of radiation for providing optical transmission radiation having a frequency of about 200 terahertz for transmission over fiber optics or use in digital electrical switches or optical switches; and
a signal up converter receptive of the modulated optical radiation and the optical transmission radiation to generate an up converted transmission signal having a frequency equal to a sum or a difference of the modulated optical radiation and the optical transmission radiation.

2. The light modulating system of claim 1 wherein the modulator is operable at ambient temperature.

3. The light modulating system of claim 1 wherein the first source comprises an optically-pumped far infrared laser, a directly multiplied source, a photo-mixer, or a quantum cascade laser.

4. The light modulating system of claim 1 wherein the modulator comprises a sideband-generator.

5. The light modulating system of claim 4 wherein the sideband-generator comprises:
a coupling structure; and
an ultra-high-frequency Schottky diode disposed at the coupling structure wherein the radiation and the information signal are coupled to the ultra-high-frequency Schottky diode, mixing therein wherein the modulated radiation is coupled out of the diode.

6. The light modulating system of claim 4 wherein the sideband-generator comprises:
a coupling structure; and
an ultra-high-frequency high electron mobility transistor disposed at the coupling structure wherein the radiation and the information signal are coupled to the ultra-high-frequency high electron mobility transistor, mixing therein wherein the modulated radiation is coupled out of the diode.

7. The light modulating system of claim 1 wherein the wavelength suitable for transmission over fiber optics comprises a wavelength of approximately 1.5 $\mu$m or other suitable communications wavelength for supplying broad band signals to either an optical fiber telecommunications system or to digital electrical or optical switches.

8. The light modulating system of claim 1 wherein the signal up converter includes a nonlinear optical mixing subsystem.

9. The light modulating system of claim 8 wherein the nonlinear optical mixing subsystem includes a crystal comprised of ZnTe, 4-dimethylamino-N-methylstilbazolium tosylate, $ZnGeP_2$ or GaP.

10. The light modulating system of claim 1 further comprising a terahertz filter acting on the modulated radiation to remove un-modulated radiation therein, wherein the terahertz filter comprises an etalon diplexer including a Silicon etalon rotated at an angle of about 45 degrees with respect to the modulated carrier signal and having a prescribed thickness as a function of the frequency of the carrier signal and the frequency range of the information signal or an inverse Fabry-Perot etalon including two parallel reflective polarizers having axial rotational orientations offset at an angle $\theta$ and thereby an adjustable finesse.

11. The light modulating system of claim 10 further comprising:
a transmission filter acting on the modulated transmission radiation to remove un-modulated radiation at the wavelength suitable for transmission over fiber optics in the modulated transmission radiation.

12. The light modulating system of claim 1 further comprising:
a transmission filter acting on the modulated transmission radiation to remove un-modulated radiation at the wavelength suitable for transmission over fiber optics in the modulated transmission radiation.

13. The communications transmission system as set forth in claim 1 wherein the signal up converter comprises a nonlinear up converter or subsystem.

14. The communications transmission system as set forth in claim 13 wherein the nonlinear up converter comprises an optical crystal.

15. A communications transmission system comprising:
a signal transmitter including:
a first radiation source for generating an optical carrier signal at a first prescribed frequency within the frequency range of approximately 300 gigahertz to 30 terahertz;
a modulator receptive of the optical carrier signal and an information signal to generate thereby a modulated optical carrier signal;
a second radiation source for generating an optical transmission signal at a frequency of about 200 terahertz; and
a signal up converter receptive of the modulated optical carrier signal and the optical transmission signal to generate an up converted optical transmission signal having a frequency equal to the sum of the frequency of the modulated optical carrier signal and the frequency of the optical transmission signal or equal to the difference between the frequency of the optical transmission signal and the frequency of the modulated optical carrier signal.

16. The communications transmission system as set forth in claim 15 wherein the first radiation source comprises a source of coherent radiation.

17. The communications transmission system as set forth in claim 16 wherein the first radiation source comprises an optically-pumped far infrared laser, a directly multiplied source, a photo-mixer, or a quantum cascade laser.

18. The communications transmission system as set forth in claim 15 wherein the second radiation source comprises a source of radiation for generating a transmission signal having a frequency suitable for transmission over an optical network.

19. The communications transmission system as set forth in claim 18 wherein the second radiation source comprises a laser.

20. The communications transmission system as set forth in claim 19 wherein the laser comprises a distributed feedback laser.

21. The communications transmission system as set forth in claim 18 wherein the frequency suitable for transmission over an optical network comprises about 200 terahertz or other suitable communications frequencies.

22. The communications transmission system as set forth in claim 15 wherein the signal up converter comprises a nonlinear up converter or subsystem.

23. The communications transmission system as set forth in claim 22 wherein the nonlinear up converter comprises an optical crystal.

24. The communications transmission system as set forth in claim 23 wherein the optical crystal comprises ZnTe, GaP, ZnGeP$_2$ or 4-dimethylamino-N-methylstilbazolium tosylate.

25. The communications transmission system as set forth in claim 15 wherein the modulator comprises a sideband generator.

26. The communications transmission system as set forth in claim 25 wherein the sideband generator comprises:
a coupling structure; and
a diode disposed at the coupling structure wherein the carrier signal and the information signal are coupled to the diode, mixing therein wherein a modulated carrier signal is thereby coupled out of the diode.

27. The communications transmission system as set forth in claim 26 wherein the diode comprises a Schottky diode.

28. The communications transmission system as set forth in claim 26 wherein the diode comprises a reflective phase modulator disposed at the coupling structure to couple the carrier signal and the information signal to the sideband generator, the information signal comprising a sideband signal.

29. The communications transmission system as set forth in claim 26 wherein the coupling structure comprises a feedhorn, a lens or a waveguide.

30. The communications transmission system as set forth in claim 25 further comprising an impedance matching device matching the impedance of the sideband generator to the impedance of the source of the information signal.

31. The communications transmission system as set forth in claim 25 wherein the sideband generator comprises:
a coupling structure; and
a transistor disposed at the coupling structure wherein the carrier signal and the information signal are coupled to the transistor, mixing therein wherein a modulated carrier signal is thereby coupled out of the transistor.

32. The communications transmission system as set forth in claim 31 wherein the transistor comprises an ultra-high-frequency high electron mobility transistor.

33. The communications transmission system as set forth in claim 31 wherein the coupling structure comprises a feedhorn, a lens or a waveguide.

34. The communications transmission system as set forth in claim 15 further comprising a first filter receptive of the modulated carrier signal for filtering unmodulated portions of the carrier sign; the first filter comprising a Silicon etalon diplexer rotated at an angle of about 45 degrees with respect to the modulated carrier signal and having a prescribed thickness as a function of the frequency of the carrier signal and the frequency range of the information signal.

35. The communications transmission system as set froth in claim 34 wherein the etalon comprises an inverse Fabry-Perot etalon comprising two parallel reflective polarizers having axial rotational orientations offset at an angle θ and thereby an adjustable finesse.

36. The communications transmission system as set forth in claim 15 further comprising a first filter receptive of the up converted transmission signal for filtering unshifted portions of the transmission signal from the up converted transmission signal.

37. The communications transmission system as set forth in claim 36 further comprising:
a detector receptive of the up converted transmission signal for detecting the information signal modulating the carrier signal providing thereby as output an electrical signal indicative of the information signal; and
an electrical-to-optical switch receptive of the electrical signal indicative of the information signal for routing the signal indicative of the information signal to one or more broad bandwidth channels for delivery to a communications network or data system.

38. The communications transmission system as set forth in claim 36 further comprising a one-to-many optical-to-optical switch receptive of the up converted transmission signal for routing the up converted transmission signal to one or more broad bandwidth channels for delivery to a communications network or data system.

39. The communications transmission system as set forth in claim 15 wherein the frequency shifted transmission signal comprises a signal shifted up in frequency.

40. The communications transmission system as set forth in claim 15 wherein the modulator is operable at ambient temperature.

41. A method of increasing the amount of information transmitted over a communications channel, the method comprising:
in a communications transmitter, modulating an optical carrier signal having a first prescribed frequency with an information signal having a prescribed first bandwidth, generating thereby a modulated optical carrier signal having a second prescribed bandwidth; and
up converting an optical transmission signal having a second prescribed frequency of about 200 terahertz with the modulated optical carrier signal, generating thereby an up converted optical transmission signal having a frequency equal to the sum of the frequency of the modulated optical carrier signal and the frequency of the optical transmission signal or equal to the difference between the frequency of the optical transmission signal and the frequency of the modulated optical carrier signal.

42. The method as set forth in claim 41 further comprising filtering the modulated carrier signal to suppress undesired frequencies in the modulated carrier signal by adjusting the finesse in an inverse Fabry-Perot etalon comprising two parallel reflective polarizers having axial rotational orientations offset at an adjustable angle θ or receiving the modulated carrier signal in a Silicon etalon diplexer having a prescribed thickness as a function of the frequency of the carrier signal and the frequency range of the information signal and the etalon diplexer being rotated at an angle of about 45 degrees with respect to the modulated carrier signal.

43. The method as set forth in claim 41 further comprising filtering the frequency shifted transmission signal to reduce the presence of undesired frequencies in the frequency shifted transmission signal.

44. The method as set forth in claim 41 wherein modulating the carrier signal with an information signal comprises modulating the carrier signal in a sideband generator.

45. The method as set forth in claim 41 wherein up converting the transmission signal with the modulated carrier signal comprises up converting the transmission signal with the modulated carrier signal in a nonlinear optical device or subsystem.

46. The method as set forth in claim 45 wherein up converting the transmission signal with the modulated carrier signal in a nonlinear optical device or subsystem comprises up converting the transmission signal with the modulated carrier signal in an optical crystal.

47. The method as set forth in claim 41 wherein the communications channel is an optical fiber.

48. The method as set forth in claim 41 further comprising filtering the modulated carrier signal to suppress undesired frequencies in the modulated carrier signal or the frequency shifted transmission signal to reduce the presence of undesired frequencies in the up converted transmission signal.

49. A method of increasing the extinction ratio of a data transmission system, the method comprising:

in a communications transmitter, modulating an optical carrier signal having a first prescribed frequency with an information signal having a prescribed first bandwidth, generating thereby a modulated optical carrier signal having a second prescribed bandwidth;

up converting an optical transmission signal having a second prescribed frequency with the modulated optical carrier signal, generating thereby an up converted optical transmission signal having a third prescribed bandwidth; and filtering the modulated optical carrier signal to suppress undesired frequencies in the modulated optical carrier signal or the up converted optical transmission signal to reduce the presence of undesired frequencies in the up converted optical transmission signal.

50. The method as set forth in claim 49 wherein modulating the carrier signal with an information signal comprises modulating the carrier signal in a sideband generator.

51. The method as set forth in claim 49 wherein up converting the transmission signal with the modulated carrier signal comprises up converting the transmission signal with the modulated carrier signal in a nonlinear up converter or subsystem.

52. The method as set forth in claim 51 wherein up converting the transmission signal with the modulated carrier signal in a nonlinear up converter or subsystem comprises up converting the transmission signal with the modulated carrier signal in an optical crystal.

* * * * *